(12) United States Patent
Haynes

(10) Patent No.: X8454
(45) Date of Patent: Oct. 16, 1834

(54) SHOE PATTERN, PERPETUAL

(76) Inventor: Samuel Haynes

Samuel Hayner, Malden, Massachusetts.

Letters Patent.

The Schedule referred to in these Letters Patent and making part of the same, containing a description in the words of the said Samuel Hayner, himself of his improvement in the mode of Cutting shoes, called "the perpetual shoe pattern."

To all to whom these presents shall come.

Be it known that Samuel Hayner, of Malden in the County of Middlesex and commonwealth of Massachusetts, Cordwainer – hath invented a new and useful improvement in the mode of Cutting shoes. – and the following is a full and exact description of the Construction and use of said improvement as invented by him – My improvement, which I call "the perpetual shoe pattern," consists in applying to a frame of wood or metal, of such dimensions as the shapes may require, any number of shoe shapes, of the established, or any other form of cutting shoes, which the operator may find convenient to use, all arranged in successive order and combination, as is shown in the accompanying drawings, and in the model present herewith, which shapes are made of paste board, leather, or any soft material and for every variety of size of shoes, I make a new combination of patterns. In applying these shapes to use, the leather is spread on a cutting table, and cut into strips of equal width with the shoe pattern intended to be used; and when cut, as many thicknesses may be placed on top of each other as the operators knife will pass through – and my perpetual shoe pattern being then applied and the knife directed to the successive spaces, the strip or strips are cut into the desired shapes. The advantage derived from the use of my "perpetual shoe pattern", over the common mode of cutting shoes, is that one or more thicknesses of leather can be cut at a time, and any number of Patterns in successive order; and the arrangement arrangement of the patterns being permanent in the frame, they are all equally perfect, and no time is lost in adjusting the pattern; and being placed in close and successive order, there is no waste of stock. Whatever may be stated in this my specification, I now declare, that the whole of my invention and all that I claim, as such, is; the combination, in successive order- of any desired number of shoe patterns, for the purpose of being applied by the manufacturer, in cutting out any number of shoes he may require, with the least expense of time and stock.

In testimony that the above is a true specification of my said improvement, as above described, I have hereto set my hand this sixteenth day of September in the year of our Lord one thousand eight hundred and thirty four.

Exd. Witnesses
W.G.C. Thomas A. Dexter
Chas. Tyng.

Saml. Haynes.

(737 Words)